US012634997B2

(12) United States Patent (10) Patent No.: US 12,634,997 B2

Izadinasab et al. (45) Date of Patent: May 19, 2026

(54) DISTANCE-BASED PHYSICAL RANDOM-ACCESS CHANNEL TIMING ADVANCE TO FACILITATE CELL RANGE IMPROVEMENT

(71) Applicant: Dell Products L.P., Round Rock, TX (US)

(72) Inventors: Kazem Izadinasab, Kitchener (CA); Evgeny Paltin, Montreal (CA); Eran Goldstein, Montreal (CA); Jayaram Venguduswamy Srinivasan, Nepean (CA)

(73) Assignee: DELL PRODUCTS L.P., Round Rock, TX (US)

( * ) Notice: Subject to any disclaimer, the term of this patent is extended or adjusted under 35 U.S.C. 154(b) by 221 days.

(21) Appl. No.: 18/363,084

(22) Filed: Aug. 1, 2023

(65) Prior Publication Data

US 2025/0048430 A1     Feb. 6, 2025

(51) Int. Cl.
*H04W 74/0833* (2024.01)
*H04W 74/00* (2009.01)
*H04W 74/04* (2009.01)

(52) U.S. Cl.
CPC ..... *H04W 74/0833* (2013.01); *H04W 74/004* (2013.01); *H04W 74/04* (2013.01)

(58) Field of Classification Search
None
See application file for complete search history.

(56) References Cited

U.S. PATENT DOCUMENTS

2014/0044108 A1* 2/2014 Earnshaw ............. G01S 5/0063
370/336
2017/0111103 A1* 4/2017 Rowland ........... H04W 56/0005
(Continued)

FOREIGN PATENT DOCUMENTS

EP        2 381 726        10/2011
EP        2381726 A1 * 10/2011 ........ H04W 74/0833
(Continued)

OTHER PUBLICATIONS

Chakapani, et al., "On the Design Details of SS/PBCH, Signal Generation and PRACH in 5G-NR," Published in: IEEE Access ( vol. 8), Date of Publication Jul. 20, 2020, DOI: 10.1109/Access. 2020.3010500.

(Continued)

*Primary Examiner* — Faiyazkhan Ghafoerkhan

(74) *Attorney, Agent, or Firm* — Amin, Turocy & Watson, LLP

(57) ABSTRACT

The technology described herein is directed towards advancing a user equipment's initial access PRACH (physical random access channel) transmission message based on the distance between the user equipment and the base station so that the message is received within the detection window time interval of the base station (e.g., gNodeB). The timing advance can be determined based on the estimated detection window time interval's midpoint to increase the probability of the transmitted PRACH message being successfully detected by the base station. In one alternative, for unsuccessful detection the timing advance data can be modified for one or more PRACH message transmission reattempts, e.g., by multiples of the detection window time interval. In another alternative, for unsuccessful detection based on the transmitted preamble identifier not equaling the base station's returned preamble identifier, the timing advance can (Continued)

be increased or decreased based on the transmitted preamble identifier and the returned preamble identifier.

20 Claims, 12 Drawing Sheets

(56)                References Cited

U.S. PATENT DOCUMENTS

| | | | | |
|---|---|---|---|---|
| 2020/0145120 | A1 * | 5/2020 | Mueller | H04W 56/0045 |
| 2024/0430939 | A1 | 12/2024 | Izadinasab et al. | |
| 2025/0048430 | A1 * | 2/2025 | Izadinasab | H04W 74/0833 |

FOREIGN PATENT DOCUMENTS

| | | | | |
|---|---|---|---|---|
| EP | 3 672 334 | 6/2020 | | |
| EP | 3672334 A1 * | 6/2020 | | H04W 56/009 |

OTHER PUBLICATIONS

3GPP, "5G NR; Physical channel and modulation", 3GPP TS 38.211 version 15.8.0 Release 15, Publication Date: Jan. 20, 2020, https://www.etsi.org/deliver/etsi_ts/138200_138299/138211/15.08.00_60/ts_138211v150800p.pdf.

International Search Report and Written Opinion for PCT Application No. PCT/US2023/036308 mailed Apr. 10, 2024, 15 pages.

International Preliminary Report on Patentability received for PCT Application Serial No. PCT/US2023/036308 dated Feb. 12, 2026, 9 pages.

Communication pursuant to Rules 161(1) and 162 EPC for EP Application Serial No. 23817240.7 dated Mar. 10, 2026.

* cited by examiner

100

102

Distance

104

User Equipment

Distance Determination Logic

Distance

Advance Time Determination Logic failure

PRACH Transmission Component

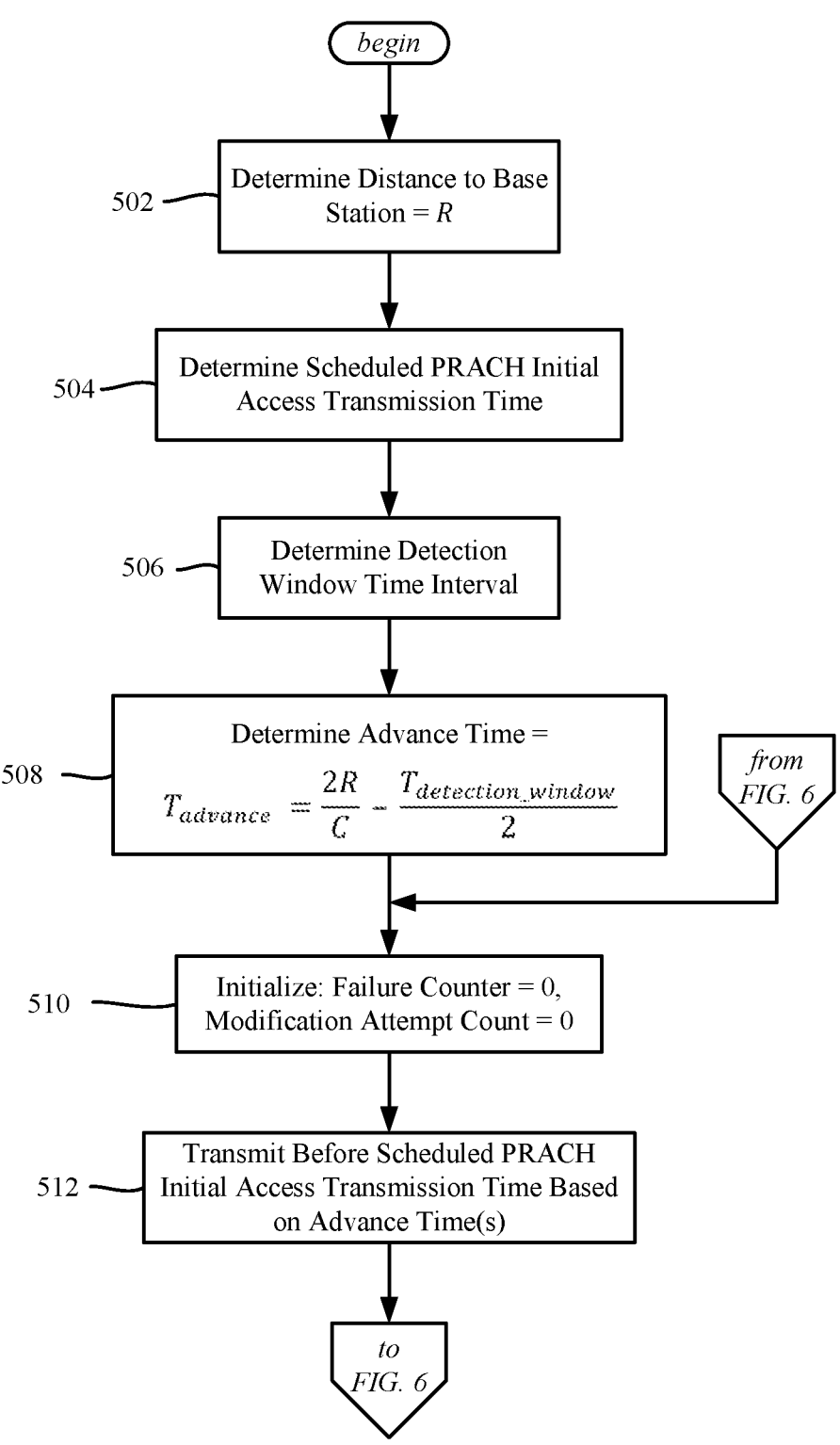

502 — Determine Distance to Base Station = R

504 — Determine Scheduled PRACH Initial Access Transmission Time

506 — Determine Detection Window Time Interval

508 — Determine Advance Time =

$$T_{advance} = \frac{2R}{C} - \frac{T_{detection\_window}}{2}$$

from FIG. 6

510 — Initialize: Failure Counter = 0, Modification Attempt Count = 0

512 — Transmit Before Scheduled PRACH Initial Access Transmission Time Based on Advance Time(s)

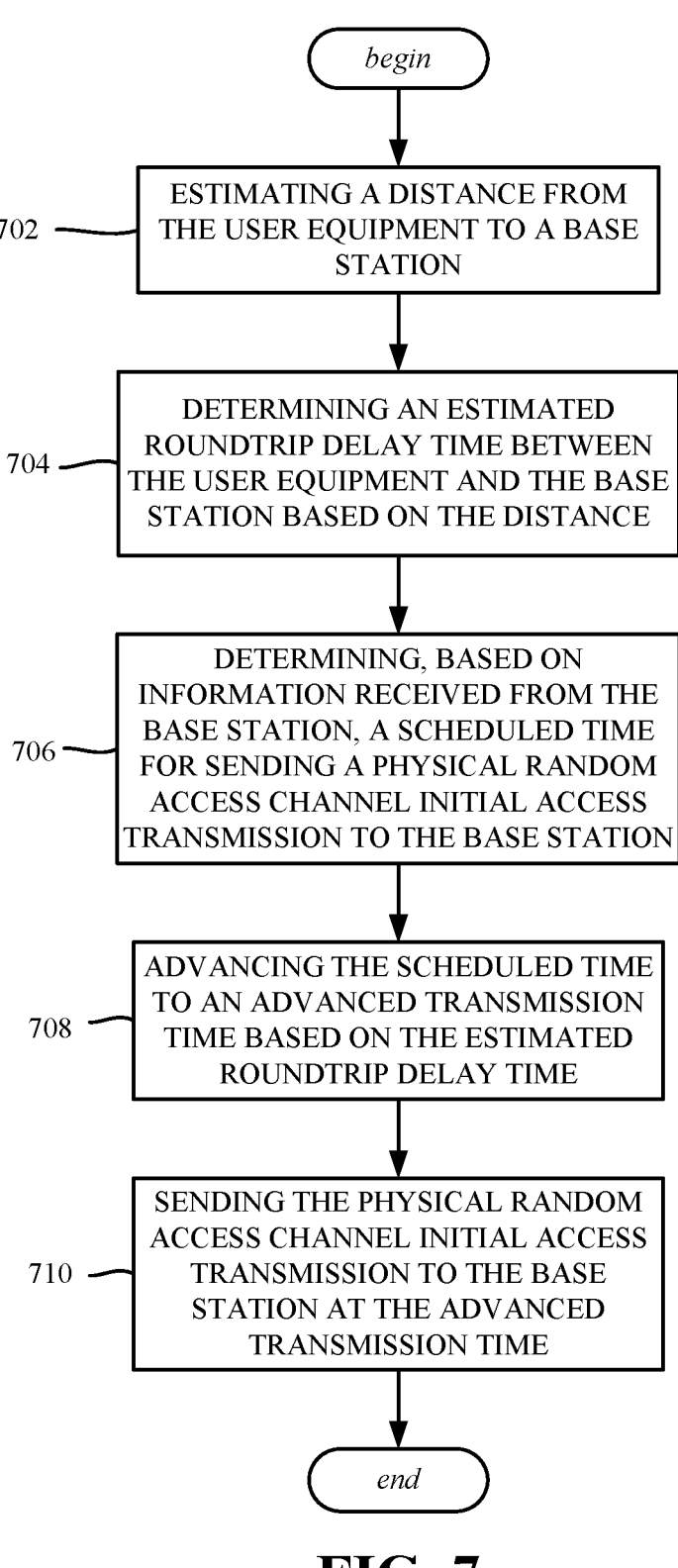

begin

702 — ESTIMATING A DISTANCE FROM THE USER EQUIPMENT TO A BASE STATION

704 — DETERMINING AN ESTIMATED ROUNDTRIP DELAY TIME BETWEEN THE USER EQUIPMENT AND THE BASE STATION BASED ON THE DISTANCE

706 — DETERMINING, BASED ON INFORMATION RECEIVED FROM THE BASE STATION, A SCHEDULED TIME FOR SENDING A PHYSICAL RANDOM ACCESS CHANNEL INITIAL ACCESS TRANSMISSION TO THE BASE STATION

708 — ADVANCING THE SCHEDULED TIME TO AN ADVANCED TRANSMISSION TIME BASED ON THE ESTIMATED ROUNDTRIP DELAY TIME

710 — SENDING THE PHYSICAL RANDOM ACCESS CHANNEL INITIAL ACCESS TRANSMISSION TO THE BASE STATION AT THE ADVANCED TRANSMISSION TIME end

FIG. 7

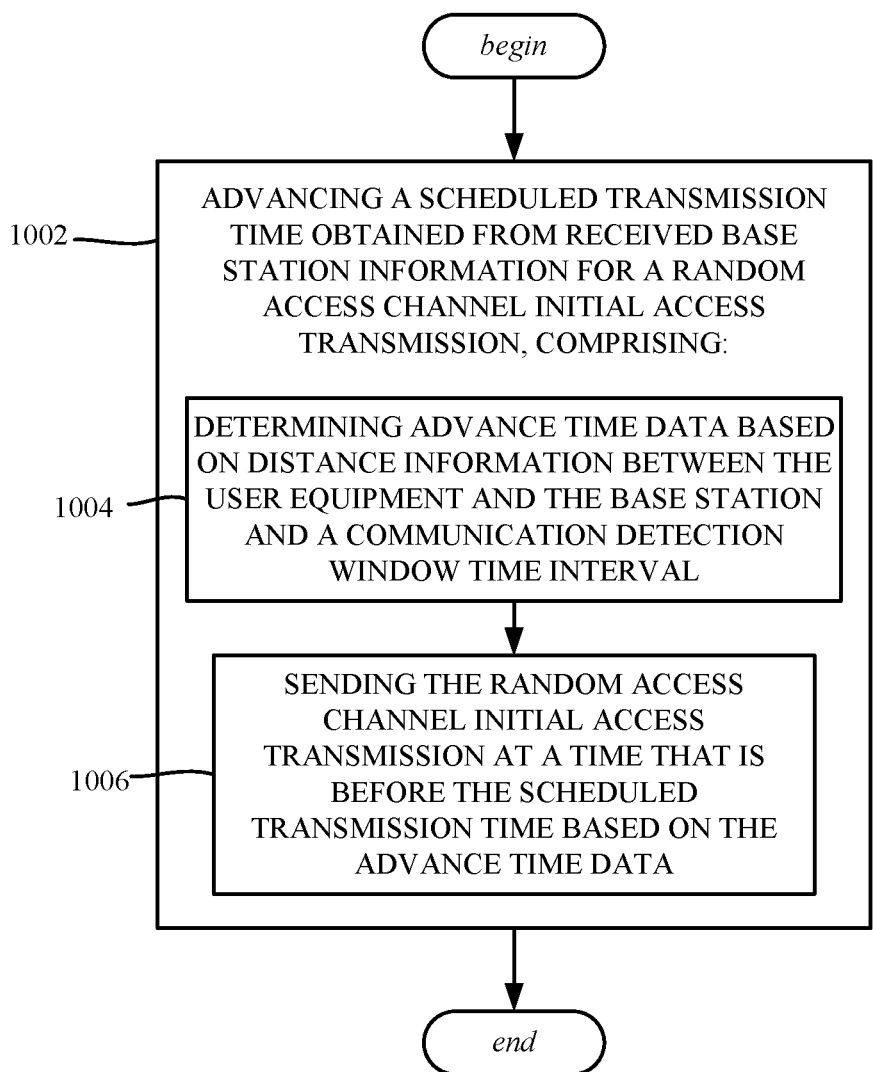

begin

1002 — ADVANCING A SCHEDULED TRANSMISSION TIME OBTAINED FROM RECEIVED BASE STATION INFORMATION FOR A RANDOM ACCESS CHANNEL INITIAL ACCESS TRANSMISSION, COMPRISING:

1004 — DETERMINING ADVANCE TIME DATA BASED ON DISTANCE INFORMATION BETWEEN THE USER EQUIPMENT AND THE BASE STATION AND A COMMUNICATION DETECTION WINDOW TIME INTERVAL

1006 — SENDING THE RANDOM ACCESS CHANNEL INITIAL ACCESS TRANSMISSION AT A TIME THAT IS BEFORE THE SCHEDULED TRANSMISSION TIME BASED ON THE ADVANCE TIME DATA end

FIG. 10

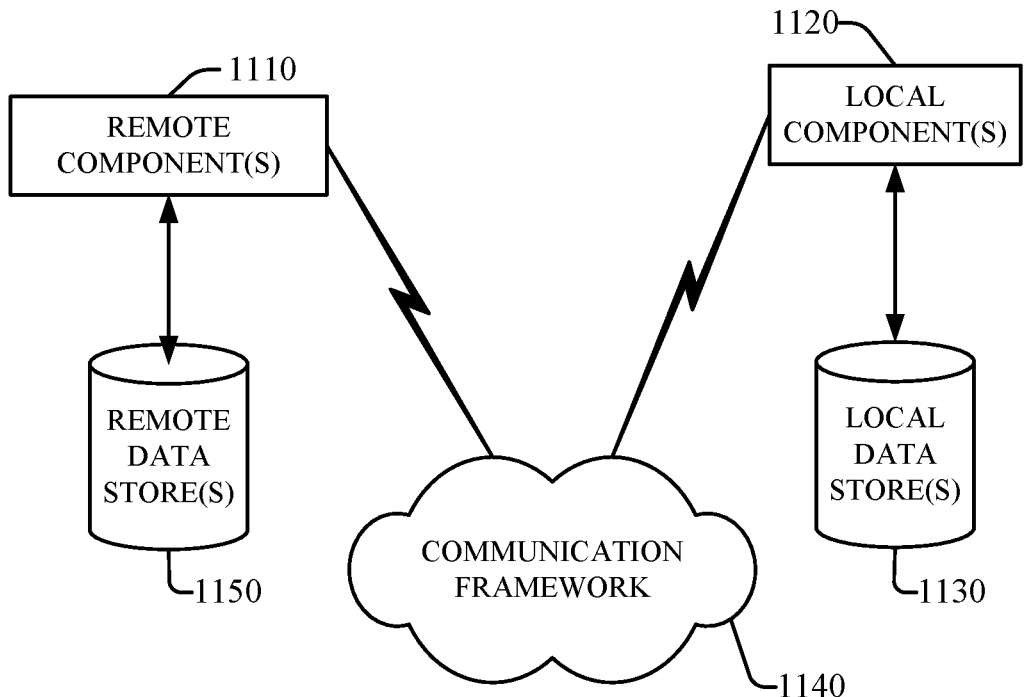
FIG. 11

DISTANCE-BASED PHYSICAL RANDOM-ACCESS CHANNEL TIMING ADVANCE TO FACILITATE CELL RANGE IMPROVEMENT

BACKGROUND

Current generation (e.g., 5G) wireless communication technologies utilize a physical random-access channel (PRACH) to facilitate a user equipment's (UE's) initial access to a network. For PRACH transmission, different numbers of root sequences and cyclic shifts per root sequence can be used. A minimum number of required root sequences and cyclic shifts per root sequence are determined so as to generate 64 PRACH preambles for PRACH transmission.

When a user equipment (UE) initially accesses the network, the UE sends one of the 64 PRACH preambles to a gNodeB (gNB). In turn, a PRACH receiver chain of the gNB correlates a corresponding received signal with all of the configured root sequences to detect a preamble peak, in which the peak position determines a preamble index. The computational complexity of a PRACH receiver of the gNB is proportional to the number of configured root sequences that are used for the PRACH transmission.

The supported cell range depends on cyclic shift offset. In the current technology, the maximal UE range (the cell range) supported by a given PRACH configuration is proportional to the number of root sequences. As the number of root sequences increases, the computational load on the gNB increases.

BRIEF DESCRIPTION OF THE DRAWINGS

The technology described herein is illustrated by way of example and not limited in the accompanying figures in which like reference numerals indicate similar elements and in which:

FIGS. 5 and 6 comprise a flow diagram representing example operations of an alternative implementation for advancing a UE's initial access PRACH transmission time and modifying the time if not successfully received and responded to, in accordance with various aspects and implementations of the subject disclosure.

FIG. 7 is a flow diagram showing example operations related to advancing a scheduled transmission time to an advanced transmission time based on estimated roundtrip delay time, in accordance with various aspects and implementations of the subject disclosure.

FIG. 10 is a flow diagram showing example operations related to advancing a scheduled transmission time via advance time data determined based UE-to-base station distance information and the base station's detection window time interval, in accordance with various aspects and implementations of the subject disclosure.

FIG. 11 is a block diagram representing an example computing environment into which aspects of the subject matter described herein may be incorporated.

DETAILED DESCRIPTION

Various aspects of the technology described herein are generally directed towards increasing the effective cell range without increasing the number of root sequences. As will be understood, this is accomplished based on distance estimation by a user equipment (UE) to the base station, and compensating an equivalent roundtrip delay when transmitting the initial access (physical random-access channel) PRACH.

More particularly, the roundtrip time is used to determine advance time data, with the scheduled time for sending the initial access PRACH transmission moved up based on the advance time data. This results in the initial access PRACH transmission likely being received within the base station's communication detection window time interval (timeframe) for receiving the PRACH transmission, even for relatively large distances, thereby increasing the cell range with respect to the UE. In the event that the PRACH transmission is not successfully received and responded to by the base station, modifications to the advance time data/the advanced transmission time can be made, followed by reattempt actions that aim for successful reception within the detection window time interval.

It should be understood that any of the examples herein are non-limiting. As one example, the technology is described in a new radio (e.g., 5G) environment, however this is only an example and can be implemented in similar environments, including those not yet implemented. It also should be noted that terms used herein, such as "optimization," "optimize" or "optimal" and the like (e.g., "maximize," "minimize" and so on) only represent objectives to move towards a more optimal state, rather than necessarily obtaining ideal results.

Reference throughout this specification to "one embodiment," "an embodiment," "one implementation," "an implementation," etc. means that a particular feature, structure, or characteristic described in connection with the embodiment/implementation is included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations.

Aspects of the subject disclosure will now be described more fully hereinafter with reference to the accompanying drawings in which example components, graphs and/or operations are shown. In the following description, for purposes of explanation, numerous specific details are set forth in order to provide a thorough understanding of the various embodiments. However, the subject disclosure may be embodied in many different forms and should not be construed as limited to the examples set forth herein.

Figure 1:
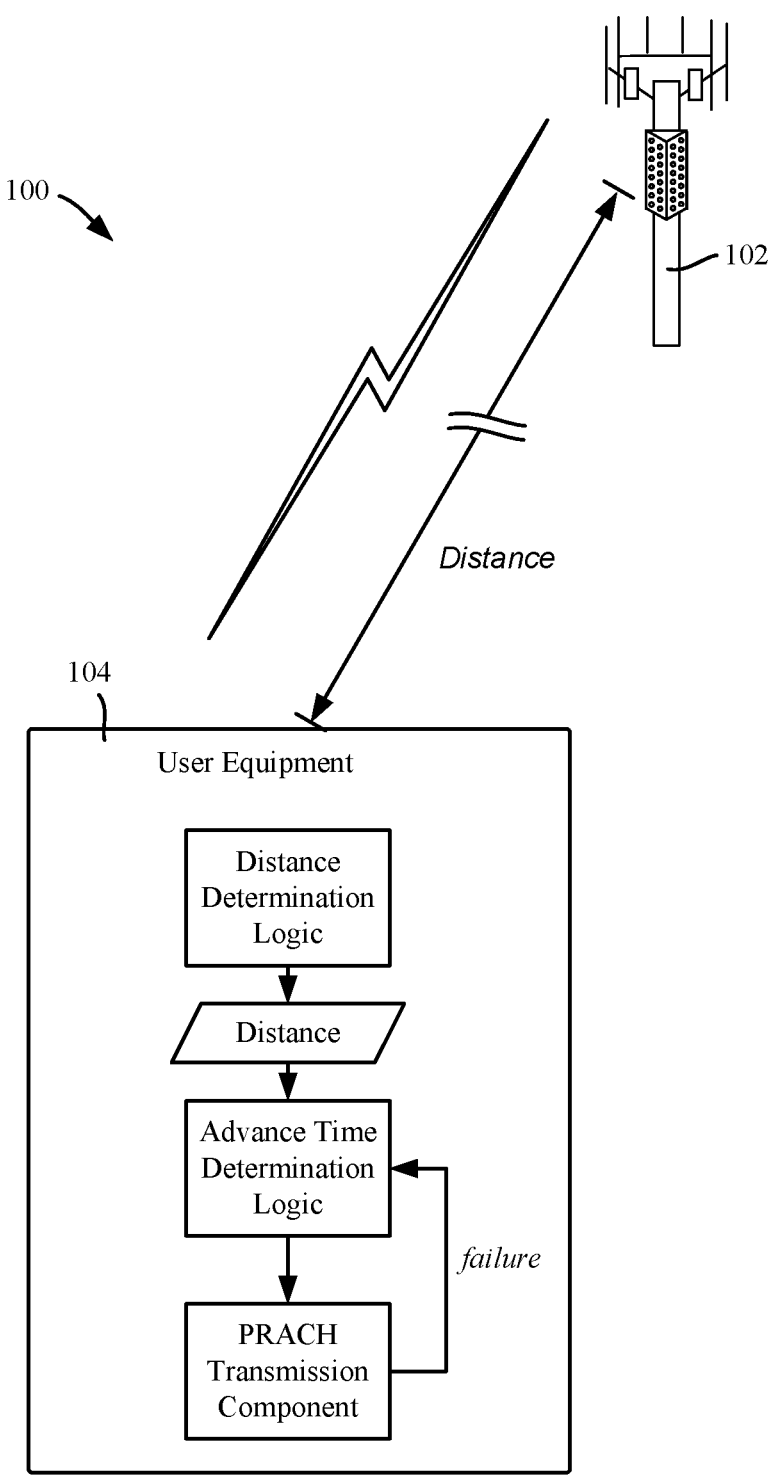
FIG. 1 depicts an example block diagram representation of an example system/architecture including radio equipment configured to advance a user equipment's (UE's) initial access physical random-access channel (PRACH) transmission based on distance, in accordance with various aspects and implementations of the subject disclosure.

FIG. 1 is an example representation of a system/architecture 100 in which a base station 102 (e.g., a gNodeB) communicates with a user equipment 104 (UE). As shown in FIG. 1, the radio equipment 104 includes distance determination logic 106 that estimates a distance 108 to the base station 102. Based on the estimated distance 108, advance time determination logic 110 determines advance time data corresponding to moving up the scheduled transmission time for a PRACH initial access transmission (message) as described herein to target the base station's detection window time interval for receiving such transmissions. A PRACH transmission component 112 sends PRACH initial access transmission at the advanced time. In the event of a failure, the advance time determination logic 110 can modify the advance time and reattempt the PRACH initial access transmission message for sending at the advanced time, as also described herein.

Figure 2:
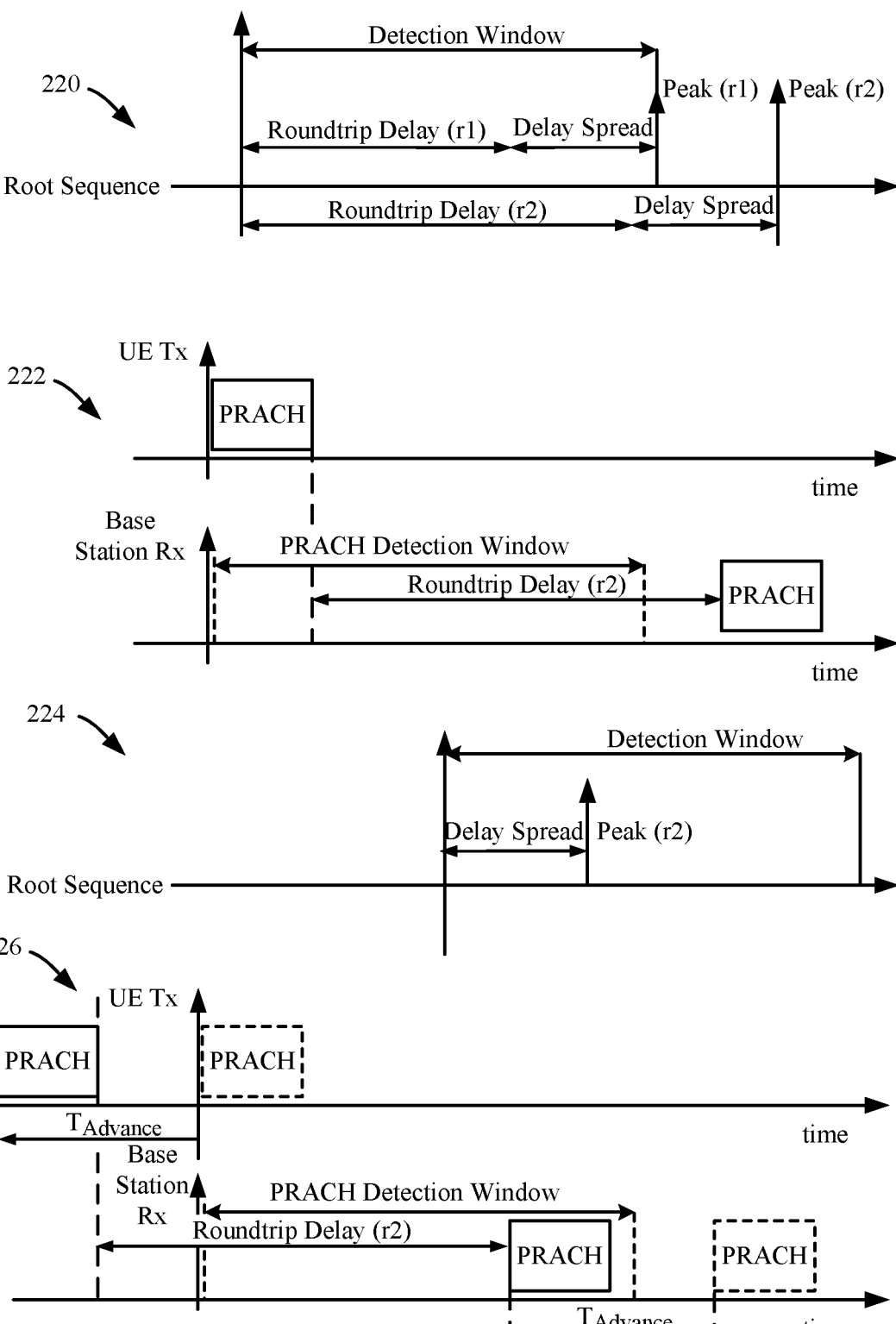
FIG. 2 is a representation of example timing diagrams illustrating how advancing a UE's initial access PRACH transmission can increase the likelihood of detection by a base station, in accordance with various aspects and implementations of the subject disclosure.

FIG. 2 shows the concept of advancing the PRACH transmission time via example timing diagrams. An example root sequence timing diagram 220 shows that at a first distance (r1), a UE's preamble peak (for r1) is received at the very end of the detection window, meaning that r1 is the maximum distance the UE can be from the base station given the roundtrip delay time for r1 and the delay spread that results from the UE-base station communication channel, (where delay spread refers to signal delays resulting from different paths and/or the physical properties of the propagation media). Thus, at a larger distance of r2, the preamble peak (for r2) is received outside of the detection window.

Indeed, as shown in the example timing diagram 222, a PRACH transmission transmitted at the scheduled time from the UE (UE Tx) to the base station is outside the detection window (base station Rx), and thus unsuccessful. However, as will be understood, moving up the PRACH transmission time effectively corresponds to moving back the detection window timeframe, as shown in the example root sequence timing diagram 224, such that the preamble peak at distance r2 is received within the detection window.

More particularly, as shown in the example UE TX, base station Rx timing diagram 226, a PRACH transmission (the solid PRACH block) transmitted at a distance of r2 at an advanced time $T_{advance}$ before the scheduled time (the dashed PRACH block) from the UE (UE Tx) to the base station is received (the solid PRACH block in the base station Rx) inside the detection window rather than too late (the dashed PRACH block). Thus, because of the timing advance, the message is successfully received, thereby increasing the cell range without increasing the number of root sequences/the computational load on the base station.

In order to determine the advance time data, distance estimation by the UE and compensating for an equivalent roundtrip delay when transmitting the PRACH is described herein. In one set of operations, the UE estimates its distance from the gNodeB (gNB), denoted as R. This is shown as operation 302 of FIG. 3.

Non-limiting ways to determine the distance include using the path loss calculated using information in the system information block (SIB), which is already an existing feature for 5G UEs. The distance from the gNB can be estimated using the path loss and the free propagation model, (or other suitable channel models). Note that instead of the free propagation model, the gNB can broadcast a suitable model for estimating the channel models for the specific cell environment. Another way to determine the distance between the UE and the gNB is by using UE GPS information (when available). The gNB location is provided in the SIB.

Once the distance R is estimated, the UE can calculate the corresponding roundtrip delay, and use the roundtrip delay in determining when to sending the UE's RACH transmission. If the UE estimates its distance from the gNB, within margins of error, the PRACH receiver will detect the correct preamble index.

Figure 3:
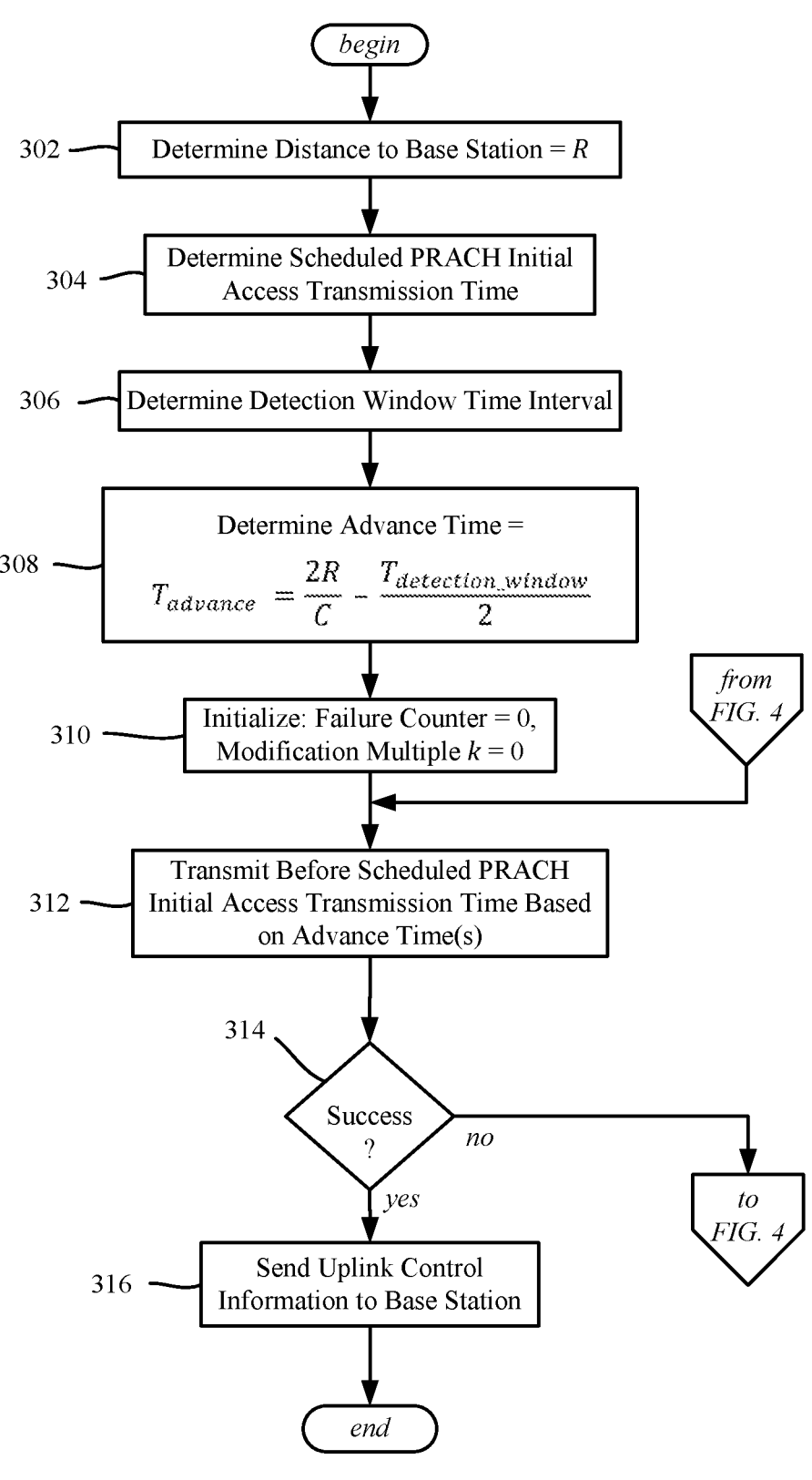
FIGS. 3 and 4 comprise a flow diagram representing example operations of one implementation for advancing a UE's initial access PRACH transmission time and modifying the time if not successfully received and responded to, in accordance with various aspects and implementations of the subject disclosure.

Note that the gNB provides the data from which the scheduled time for the PRACH transmission is known to the UE, as represented in FIG. 3 via operation 304. This scheduled time, however, assumes that the UE is within a certain maximum distance to the base station, e.g., as described via the example root sequence timing diagram 220 of FIG. 2.

To reduce the impact of estimation errors, the UE can aim the advance time data to reach the base station at the middle of the detection window, which will maximize the probability of getting detected:

$$T_{advance} = \frac{2*R}{C} - \frac{T_{detection\_window}}{2},$$

where C is the speed of light and $T_{detection\_window}$ is the detection window time interval.

Note that the UE can calculate the detection window time interval (size) by using the cyclic shift offset (denoted as $N_{cs}$) from its corresponding index, which is sent by the gNB. These operations are represented in FIG. 3 via operations 306 and 308. It should be noted that the UE will not delay the uplink timing frame (and the PRACH message as part of the uplink), but rather advance the uplink timing frame as described herein (although the $T_{advance}$ can be zero). In other words, $T_{advance} \geq 0$.

After being sent (operation 312), if the PRACH message (MSG1) is successfully received as evaluated at operation 314, access if the UE to the base station is granted. Operation 316 represents the UE sending uplink control information to the base station once access is granted.

Figure 4:
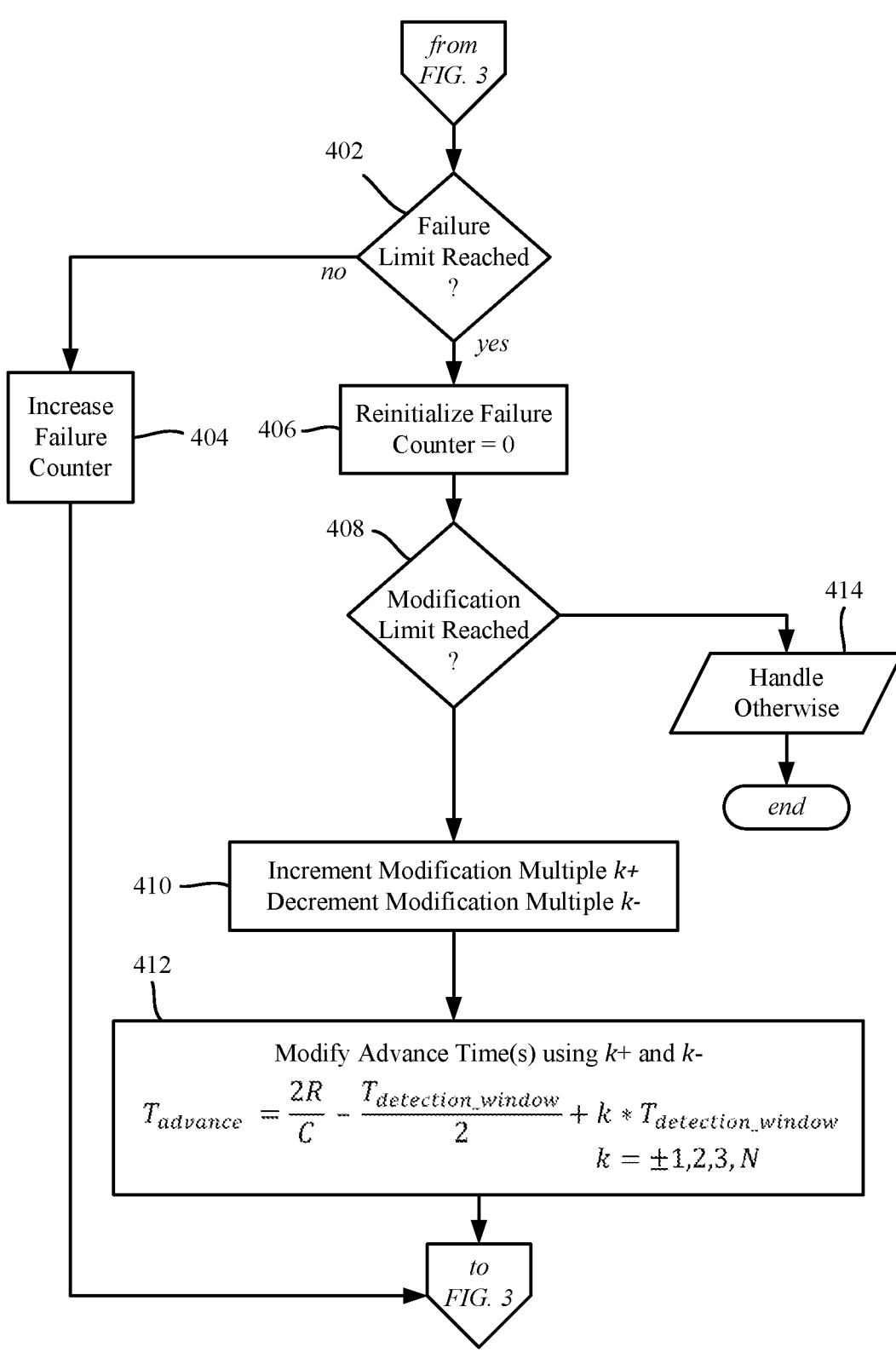

Although the likelihood of the PRACH message being received within the base station's detection window time interval is thus increased due to the timing advance as described herein, there is a possibility that the PRACH message is not successfully received within the timeframe, e.g., due to estimation errors. Thus, failures are possible, and can be handled as described herein. Note that a failure can occur because no response message from the gNB is received within an expected time, or because a response message (MSG2) from the gNB is timely received but the preamble identifier in the UE's transmitted PRACH message does not equal the counterpart preamble identifier returned in the response message from the gNB. With respect to possible failures, operation 310 initializes a failure counter and a modification multiple value in case a reattempt is needed, as described with reference to FIG. 4.

More particularly, there is a limit as to how many failed PRACH attempts are allowed by the UE (the limit is a parameter that can be defined and configured for the UE). Operation 402 of FIG. 4 evaluates whether the failure limit has been reached, based on the counter (initialized to zero at operation 310 of FIG. 3). In this example, consider that the failure limit has not yet been reached, and thus operation 402 branches to operation 404, which increases the failure counter and returns to operation 308 to reattempt the initial access PRACH transmission. The UE can increase the PRACH power with each further attempt.

If still unsuccessful, after multiple failed PRACH attempts by the UE (the counter has reached the failure limit), in one example implementation the UE can scan the entire range of possible delay times, adding and subtracting a (e.g., an integer) multiple of detection delay windows so as to modify the advance time:

$$T_{advance} = \frac{2R}{C} - \frac{T_{detection\_window}}{2} + k * T_{detection\_window};$$

$$k = \pm 1, \pm 2, \pm 3, \ldots, \pm N$$

where the value N (which sets the modification limit) can be defined by the base station and provided to the UE via a broadcast message (SIB1 in 4G and 5G).

In this example, consider that the modification limit has not yet been reached at operation 408, and thus the modification multiple k is incremented (to k+) and decremented (to k−) at operation 410. As seen at operation 412, corresponding to the above $T_{advance}$ modification formula, $T_{advance}$ is changed by a multiple of the detection window time, and a reattempt based on the new $T_{advance}$ time value at operation 312 of FIG. 3. Note that the increased and decreased advanced transmission time PRACH message can be attempted at the next appropriate timeframe rather than separately attempted, although separate attempts can alternatively be made. Note further that the decreased time will never delay transmission relative to the gNB-scheduled time, that is, as set forth herein, $T_{advance} \geq 0$ as a constraint.

The failure counter can be reinitialized at operation 406 so that each modified advance time can be retried up to the failure limit; (the transmit power can also be lowered). It is feasible, however, to use a different number of retries when reattempting with a modified advance time, e.g., change the failure limit/initialize the counter to something other than zero. In addition, once the modification multiple k has reached a limit, e.g., k=±N was attempted, operation 408 will halt the process (operation 414). This can, for example, be similar to current systems that "give up" after the configured number of retries has been attempted (although time advancement/modified time advancement is not considered in those current systems.

Figure 6:
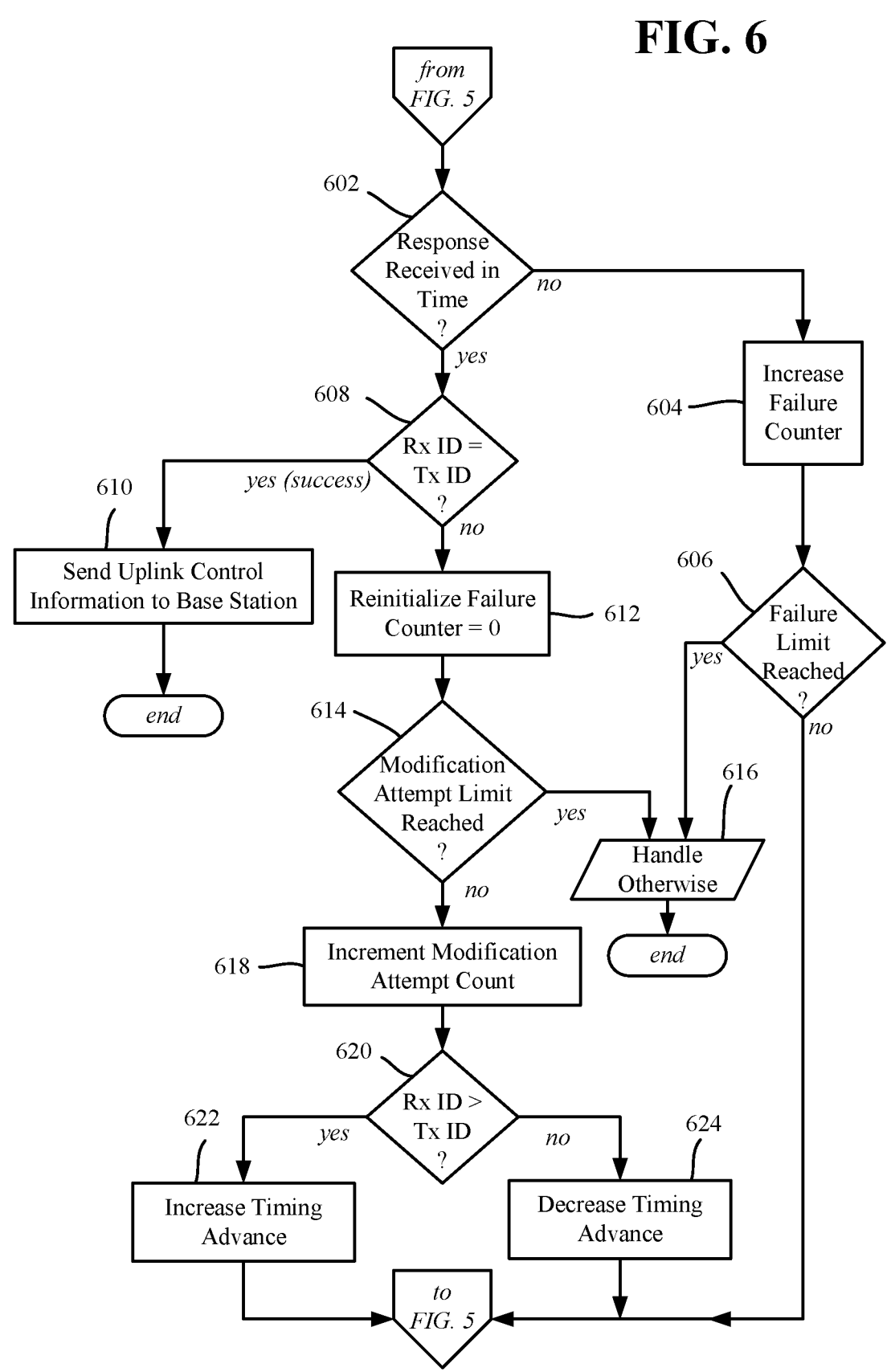

An alternative implementation is shown in FIGS. 5 and 6, in which instead of a modification multiple ±k, the UE modifies its PRACH timing advance based on the received downlink response message from the gNB. Note that the operations 502-512 of FIG. 5 are similar to those of operations of 302-312 FIG. 3, and thus are not described again for purposes of brevity except to note that in this alternative operation 510 initializes a modification attempt count to zero, and operation 512 continues to operation 602 of FIG. 6.

In FIG. 6, operation 602 evaluates for one failure condition, that is, when no response message from the gNB was received in time. If so, this is handled as in FIGS. 3 and 4, e.g., a failure counter is increased at operation 604, and unless the failure limit reached at operation 606, the process returns to operation 512 of FIG. 5 to reattempt the initial access PRACH message transmission, e.g., with increased power per reattempt. If reached at operation 606, operation 616 halts the process.

In this example implementation, consider that the response is received in time, and thus operation 602 branches to operation 608. Operation 608 evaluates the response message, and if the received preamble identifier (Rx PRE_ID) equals the transmitted preamble identifier (Tx PRE_ID), the initial access request was properly detected by the gNB, and this access grant success results in operation 610 sending uplink control information to the gNB and so on as is known for a successful access attempt.

However, if instead the received preamble identifier (Rx PRE_ID) does not equal the transmitted preamble identifier (Tx PRE_ID), then operation 608 branches to operation 612 (which reinitializes the failure counter in this example so that some number of retries can be made with modified advance times). More particularly, if the UE does not receive the MSG2 downlink response with the transmitted Tx PRE_ID, the UE modifies the uplink timing by assuming that the downlink message was meant for the UE, but the response message had the wrong Rx PRE_ID because the PRACH was received outside the detection window. Whether the UE increases or decreases the timing advance (again, subject to the constraint that $T_{advance} \geq 0$) depends on whether the Rx PRE_ID is greater than or less than the Tx PRE_ID as evaluated at operation 620. For example, if the UE has transmitted PRE_ID=5, and the UE receives PRE_ID=6, then in the next attempt the UE increases the timing advance via operation 622. If the UE instead received Rx PRE_ID=4 then UE decreases the timing advance via operation 624.

It should be noted that the number of reattempts with modified $T_{advance}$ times can be limited. In this example, operation 614 evaluates for the modification attempt limit having been reached, with the corresponding modification attempt counter increased via operation 618 for each reattempt. If reached, operation 616 will halt the process.

One or more aspects can be embodied in a user equipment, such as represented in the example operations of FIG. 7, and for example can include a memory that stores computer executable components and/or operations, and a processor that executes computer executable components and/or operations stored in the memory. Example operations can include operation 702, which represents estimating a distance from the user equipment to a base station. Example operation 704 represents determining an estimated roundtrip delay time between the user equipment and the base station based on the distance. Example operation 706 represents determining, based on information received from the base station, a scheduled time for sending a physical random access channel initial access transmission to the base station. Example operation 708 represents advancing the scheduled time to an advanced transmission time based on the estimated roundtrip delay time. Example operation 710 represents sending the physical random access channel initial access transmission to the base station at the advanced transmission time.

Advancing the scheduled time to the advanced transmission time can be further based on a physical random access channel detection window timeframe of the base station.

Further operations can include determining the detection window timeframe by using cyclic shift offset data based on information received from the base station.

Advancing the scheduled time to the advanced transmission time can be further based on a midpoint of a physical random access channel detection window timeframe of the base station.

Estimating the distance from the user equipment to the base station can include determining path loss data based on system information block data obtained from the base station.

Estimating the distance from the user equipment to the base station can include determining path loss data based on system information block data obtained from the base station and model data representative of a free propagation model.

Estimating the distance from the user equipment to the base station can include determining path loss data based on system information block data obtained from the base station and a propagation model associated with propagation model information broadcast by the base station.

Advancing the scheduled time to the advanced transmission time can be further based on a physical random access channel detection window timeframe of the base station, and further operations can include detecting that an attempt counter representing a number of failed physical random access channel attempts satisfies a failure attempt limit criterion, and, in response to the detecting, modifying the advanced transmission time to a modified advanced transmission time, comprising at least one of: adding a multiple of the detection window timeframe to the advanced transmission time, or subtracting a multiple of the detection window timeframe from the advanced transmission time, and sending a reattempted physical random access channel initial access transmission to the base station at the modified advanced transmission time.

The failure attempt limit criterion can be a first failure attempt limit criterion, the modified advanced transmission time can be a first modified advanced transmission time, and further operations can include, detecting that a reattempt counter representing a number of failed physical random access channel reattempts satisfies a second failure attempt limit criterion, and, in response to the detecting, changing the multiple of the detection window to a changed multiple, modifying the first modified advanced transmission time to a second modified advanced transmission time, comprising at least one of: adding the changed multiple of the detection window timeframe to the advanced transmission time, or subtracting the changed multiple of the detection window timeframe from the advanced transmission time, and sending a reattempted physical random access channel initial access transmission to the base station at the second modified advanced transmission time.

Advancing the scheduled time to the advanced transmission time can be further based on a physical random access channel detection window timeframe of the base station, the physical random access channel initial access transmission to the base station can be associated with a first random access preamble identifier, and further operations can include receiving a response message from the base station, detecting that a second random access preamble identifier in the response message does not equal the first random access preamble identifier, and, in response to the detecting, modifying the advanced transmission time to a modified advanced transmission time based on the second random access preamble identifier and the first random access preamble identifier.

Modifying the advanced transmission time to the modified advanced transmission time based on the second random access preamble identifier and the first random access preamble identifier can include increasing the advanced transmission time in response to the second random access preamble identifier being greater than the first random access preamble identifier.

Modifying the advanced transmission time to the modified advanced transmission time based on the second random access preamble identifier and the first random access preamble identifier can include decreasing the advanced transmission time in response to the second random access preamble identifier being less than the first random access preamble identifier.

Figure 8:
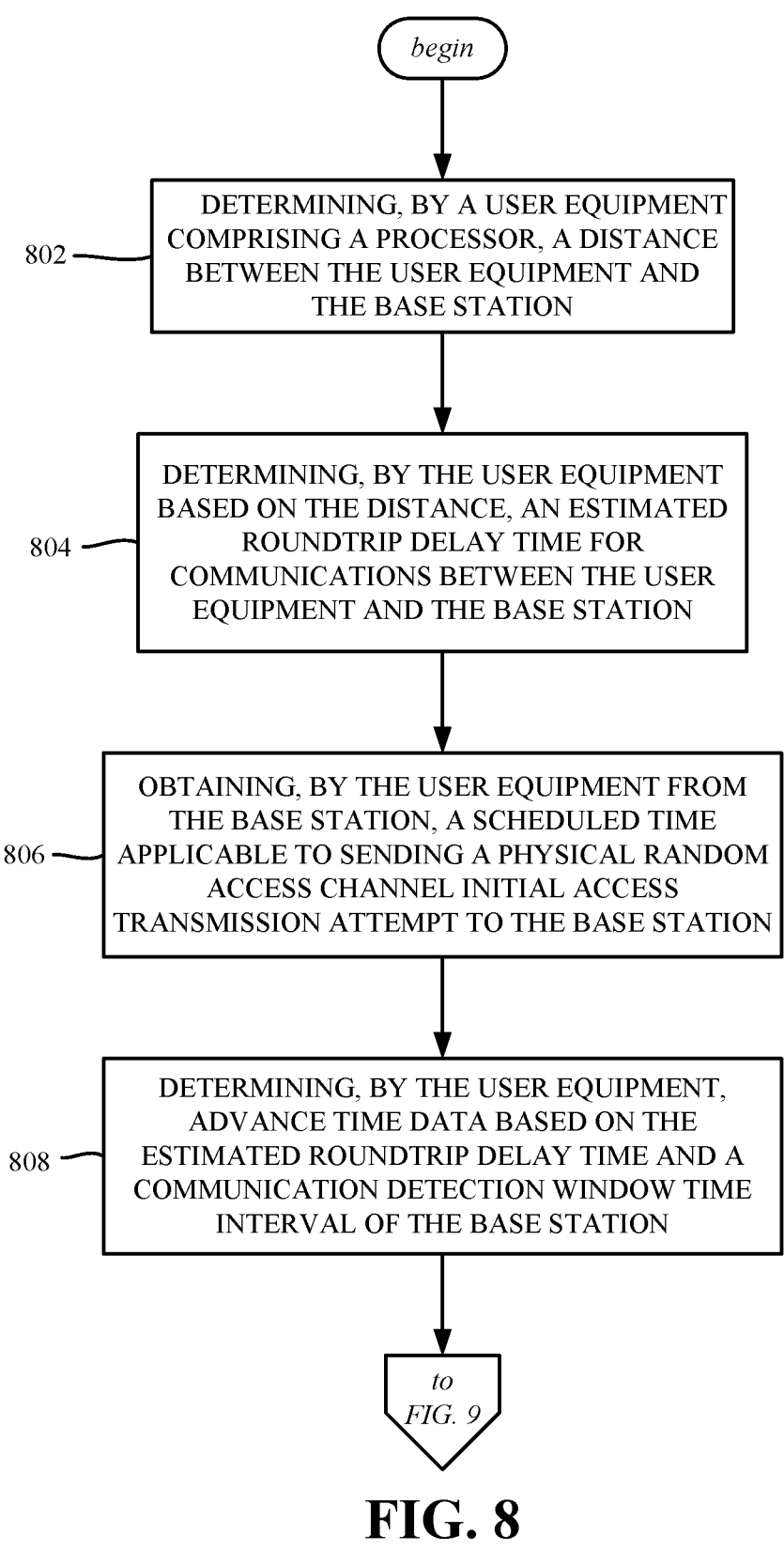
FIGS. 8 and 9 comprise a flow diagram showing example operations related to determining advance time data based on an estimated roundtrip delay time and a communication detection window time interval of the base station for sending an initial access transmission attempt, in accordance with various aspects and implementations of the subject disclosure.
Figure 9:
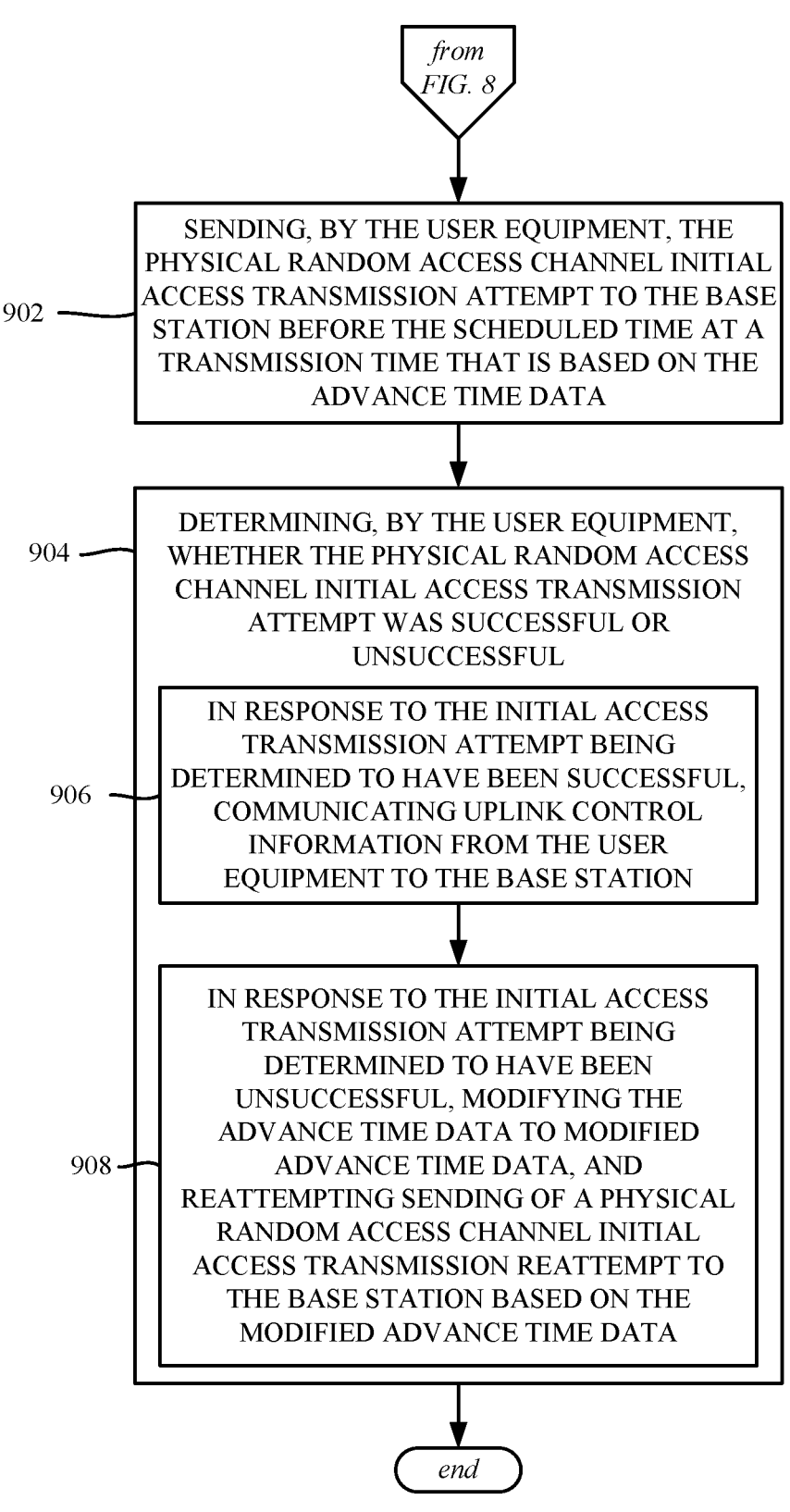

One or more example aspects, such as corresponding to example operations of a method, are represented in FIGS. 8 and 9. Example operation 802 represents determining, by a user equipment comprising a processor, a distance between the user equipment and the base station. Example operation 804 represents determining, by the user equipment based on the distance, an estimated roundtrip delay time for communications between the user equipment and the base station. Example operation 806 represents obtaining, by the user equipment from the base station, a scheduled time applicable to sending a physical random access channel initial access transmission attempt to the base station. Example operation 808 represents determining, by the user equipment, advance time data based on the estimated roundtrip delay time and a communication detection window time interval of the base station. The operations continue at FIG. 9, in which example operation 902 of FIG. 9 represents sending, by the user equipment, the physical random access channel initial access transmission attempt to the base station before the scheduled time at a transmission time that is based on the advance time data. Example operation 904 represents determining, by the user equipment, whether the physical random access channel initial access transmission attempt was successful or unsuccessful. Example operation 906 represents, in response to the initial access transmission attempt being determined to have been successful, communicating uplink control information from the user equipment to the base station. Example operation 908 represents, in response to the initial access transmission attempt being determined to have been unsuccessful, modifying the advance time data to modified advance time data, and reattempting sending of a physical random access channel initial access transmission reattempt to the base station based on the modified advance time data.

Determining whether the physical random access channel initial access transmission attempt was successful or unsuccessful can determine that the attempt was unsuccessful based on a number of failed physical random access channel reattempts satisfying a failure attempt limit criterion, and in response to determining the attempt was unsuccessful, modifying, by the user equipment, the advance time data to modified advance time data, and sending, by the user equipment, a physical random access channel initial access transmission attempt to the base station before the scheduled time at a modified transmission time that is based on the modified advance time data.

Modifying of the advance time data to the modified advance time data can include at least one of: adding a multiple of communication detection window time interval to the advance time data, or subtracting a multiple of communication detection window time interval to the advance time data to obtain the modified advance time data.

The modified transmission time can be a first modified transmission time, the modified advance time data can be first modified advance time data, the multiple can be a first multiple, and further operations can include modifying, by the user equipment, the advance time data to second modified advance time data, and sending, by the user equipment, a physical random access channel initial access transmission attempt to the base station before the scheduled time at a second modified transmission time that is based on the second modified advance time data.

The physical random access channel initial access transmission to the base station can be associated with a first random access preamble identifier, the determining whether the physical random access channel initial access transmission attempt was successful or unsuccessful can include receiving, by the user equipment, a response message from the base station, detecting that a second random access preamble identifier in the response message does not equal the first random access preamble identifier, and modifying the advance time data to the modified advance time data can include decreasing the advanced transmission time in response to the second random access preamble identifier being less than the first random access preamble identifier, and increasing the advanced transmission time in response to the second random access preamble identifier being greater than the first random access preamble identifier.

FIG. 10 summarizes various example operations, e.g., corresponding to a machine-readable medium, comprising executable instructions that, when executed by a processor of a user equipment, facilitate performance of operations. Example operation 1002 of FIG. 9 represents advancing a scheduled transmission time obtained from received base station information for a random access channel initial access transmission, which includes example operations 904 and 906. Example operation 904 of FIG. 9 represents determining advance time data based on distance information between the user equipment and the base station and a communication detection window time interval. Example operation 906 of FIG. 9 represents sending the random access channel initial access transmission at a time that is before the scheduled transmission time based on the advance time data.

Determining the advance time data can include determining a round trip time for communications based on the distance information, and subtracting one-half of the detection window time interval from the round trip time.

Sending the random access channel initial access transmission can be determined by the user equipment to be unsuccessful, and further operations can include determining modified advance time data, and resending an instance of the random access channel initial access transmission at a modified time that is before the scheduled transmission time based on the modified advance time data.

As can be seen, the technology described herein facilitates increasing a cell's range/size by using a distance estimation of the UE to the base station and compensating for the distance with a corresponding timing advance of the initial access PRACH transmission message. Note that this is in contrast to the traditional solution for of consider a larger cyclic shift offset value, (which increases the required number of root sequences for generating the preambles and consequently increases the computational complexity of the PRACH processing). Modifications to the timing advance can be made to overcome estimation or other errors that can cause the advanced PRACH transmission to not be received within the base station's detection window.

FIG. 11 is a schematic block diagram of a computing environment 1100 with which the disclosed subject matter can interact. The system 1100 comprises one or more remote component(s) 1110. The remote component(s) 1110 can be hardware and/or software (e.g., threads, processes, computing devices). In some embodiments, remote component(s) 1110 can be a distributed computer system, connected to a local automatic scaling component and/or programs that use the resources of a distributed computer system, via communication framework 1140. Communication framework 1140 can comprise wired network devices, wireless network devices, mobile devices, wearable devices, radio access network devices, gateway devices, femtocell devices, servers, etc.

The system 1100 also comprises one or more local component(s) 1120. The local component(s) 1120 can be hardware and/or software (e.g., threads, processes, computing devices). In some embodiments, local component(s) 1120 can comprise an automatic scaling component and/or programs that communicate/use the remote resources 1110, etc., connected to a remotely located distributed computing system via communication framework 1140.

One possible communication between a remote component(s) 1110 and a local component(s) 1120 can be in the form of a data packet adapted to be transmitted between two or more computer processes. Another possible communication between a remote component(s) 1110 and a local component(s) 1120 can be in the form of circuit-switched data adapted to be transmitted between two or more computer processes in radio time slots. The system 1100 comprises a communication framework 1140 that can be employed to facilitate communications between the remote component(s) 1110 and the local component(s) 1120, and can comprise an air interface, e.g., Uu interface of a UMTS network, via a long-term evolution (LTE) network, etc. Remote component(s) 1110 can be operably connected to one or more remote data store(s) 1150, such as a hard drive, solid state drive, SIM card, device memory, etc., that can be employed to store information on the remote component(s) 1110 side of communication framework 1140. Similarly, local component(s) 1120 can be operably connected to one or more local data store(s) 1130, that can be employed to store information on the local component(s) 1120 side of communication framework 1140.

Figure 12:
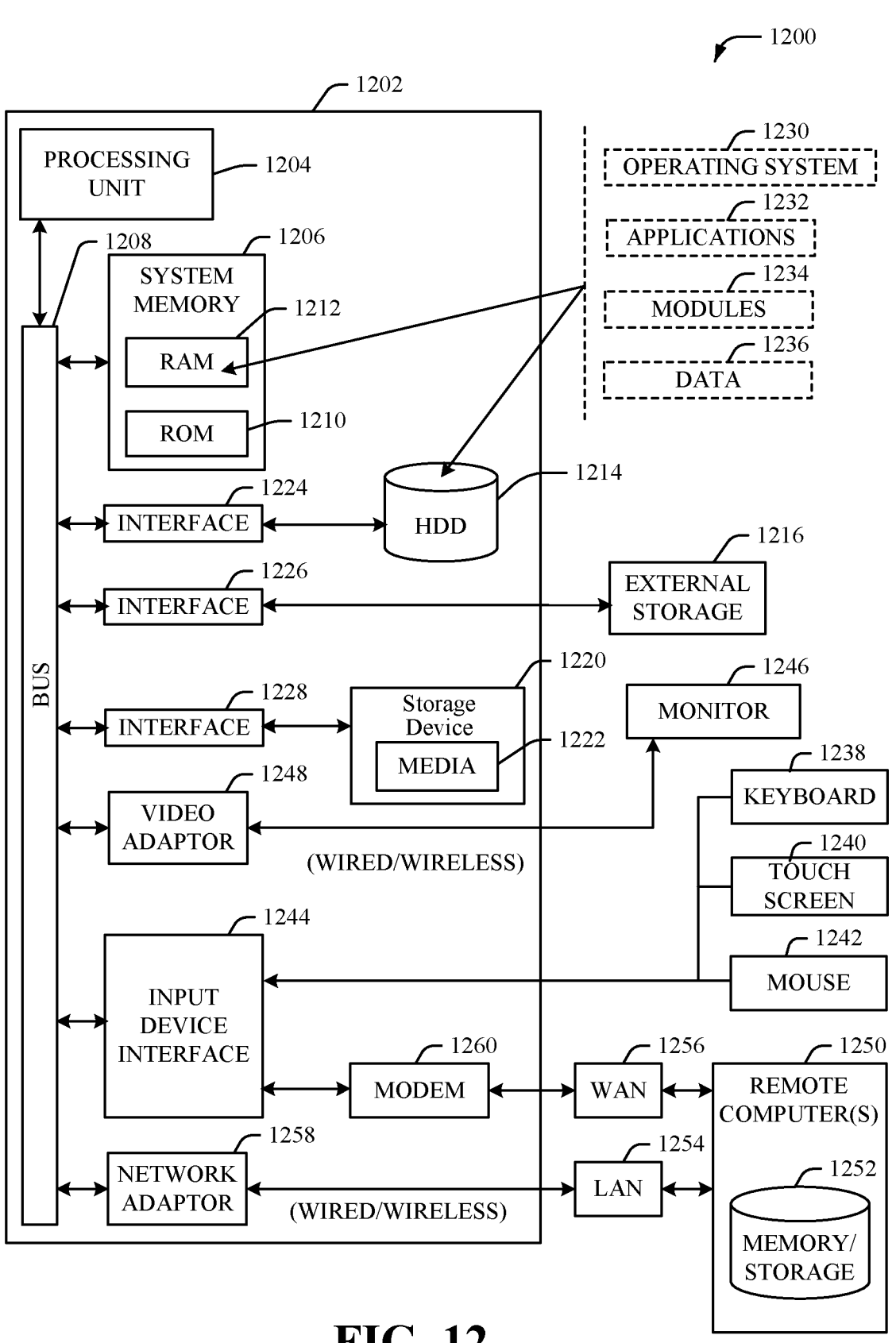
FIG. 12 depicts an example schematic block diagram of a computing environment with which the disclosed subject matter can interact/be implemented at least in part, in accordance with various aspects and implementations of the subject disclosure.

In order to provide additional context for various embodiments described herein, FIG. 12 and the following discussion are intended to provide a brief, general description of a suitable computing environment 1200 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network.

In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), and can include one or more external storage devices 1216 (e.g., a magnetic floppy disk drive (FDD) 1216, a memory stick or flash drive reader, a memory card reader, etc.). While the internal HDD 1214 is illustrated as located within the computer 1202, the internal HDD 1214 can also be configured for external use in a suitable chassis (not shown). Additionally, while not shown in environment 1200, a solid state drive (SSD) could be used in addition to, or in place of, an HDD 1214.

Other internal or external storage can include at least one other storage device 1220 with storage media 1222 (e.g., a solid state storage device, a nonvolatile memory device, and/or an optical disk drive that can read or write from removable media such as a CD-ROM disc, a DVD, a BD, etc.). The external storage 1216 can be facilitated by a network virtual machine. The HDD 1214, external storage device(s) 1216 and storage device (e.g., drive) 1220 can be connected to the system bus 1208 by an HDD interface 1224, an external storage interface 1226 and a drive interface 1228, respectively.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine (VM) of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1294 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN) 1254 and/or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the Internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are examples and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A user equipment, comprising:
at least one processor; and
at least one memory that stores executable instructions that, when executed by the at least one processor, facilitate performance of operations, the operations comprising:
estimating a distance from the user equipment to a base station;
determining an estimated roundtrip delay time between the user equipment and the base station based on the distance;
determining, based on information received from the base station, a scheduled time for sending a physical random access channel initial access, associated with a first random access preamble identifier, to the base station;
advancing the scheduled time to an advanced transmission time based on the estimated roundtrip delay time;
sending a physical random access channel initial access transmission to the base station at the advanced transmission time;
based on a response message received from the base station, detecting that a second random access preamble identifier in the response message does not equal the first random access preamble identifier; and
in response to the detecting, modifying the advanced transmission time to a modified advanced transmission time based on the second random access preamble identifier and the first random access preamble identifier, the modifying comprises:
increasing the advanced transmission time in response to the second random access preamble identifier being greater than the first random access preamble identifier, or
decreasing the advanced transmission time in response to the second random access preamble identifier being less than the first random access preamble identifier.

2. The user equipment of claim 1, wherein the advancing of the scheduled time to the advanced transmission time is further based on a physical random access channel detection window timeframe of the base station.

3. The user equipment of claim 2, wherein the operations further comprise determining the physical random access channel detection window timeframe by using cyclic shift offset data based on information received from the base station.

4. The user equipment of claim 1, wherein the advancing of the scheduled time to the advanced transmission time is further based on a midpoint of a physical random access channel detection window timeframe of the base station.

5. The user equipment of claim 1, wherein the estimating of the distance from the user equipment to the base station comprises determining path loss data based on system information block data obtained from the base station.

6. The user equipment of claim 1, wherein the estimating of the distance from the user equipment to the base station comprises determining path loss data based on system information block data obtained from the base station and model data representative of a free propagation model.

7. The user equipment of claim 1, wherein the estimating of the distance from the user equipment to the base station comprises determining path loss data based on system information block data obtained from the base station and a propagation model associated with propagation model information broadcast by the base station.

8. The user equipment of claim 1, wherein the advancing of the scheduled time to the advanced transmission time is further based on a physical random access channel detection window timeframe of the base station, and wherein the operations further comprise detecting that an attempt counter representing a number of failed physical random access channel attempts satisfies a failure attempt limit criterion, and, in response to the detecting, modifying the advanced transmission time to the modified advanced transmission time, comprising at least one of: adding a multiple of a detection window timeframe to the advanced transmission time, or subtracting the multiple of the detection window timeframe from the advanced transmission time, and sending a reattempted physical random access channel initial access transmission to the base station at the modified advanced transmission time.

9. The user equipment of claim 8, wherein the failure attempt limit criterion is a first failure attempt limit criterion, wherein the modified advanced transmission time is a first modified advanced transmission time, and wherein the operations further comprise, detecting that a reattempt counter representing a number of failed physical random access channel reattempts satisfies a second failure attempt limit criterion, and, in response to the detecting, changing the multiple of the detection window timeframe to a changed multiple, modifying the first modified advanced transmission time to a second modified advanced transmission time, comprising at least one of: adding the changed multiple of the detection window timeframe to the advanced transmission time, or subtracting the changed multiple of the detection window timeframe from the advanced transmission time, and sending the reattempted physical random access channel initial access transmission to the base station at the second modified advanced transmission time.

10. A method, comprising:

determining, by a user equipment comprising at least one processor, a distance between the user equipment and a base station;

determining, by the user equipment based on the distance, an estimated roundtrip delay time for communications between the user equipment and the base station;

obtaining, by the user equipment from the base station, a scheduled time applicable to sending a physical random access channel initial access transmission attempt to the base station, wherein the physical random access channel initial access transmission attempt is associated with a first random access preamble identifier;

determining, by the user equipment, advance time data based on the estimated roundtrip delay time and a communication detection window time interval of the base station;

sending, by the user equipment, the physical random access channel initial access transmission attempt to the base station before the scheduled time at a transmission time that is based on the advance time data;

determining, by the user equipment, whether the physical random access channel initial access transmission attempt was successful or unsuccessful based on receipt of a response message from the base station, the response message comprises a second random access preamble identifier; and in response to the initial access transmission attempt being determined to have been successful, communicating uplink control information from the user equipment to the base station; and in response to the initial access transmission attempt being determined to have been unsuccessful, modifying the advance time data to modified advance time data, wherein the modifying comprises:

based on the second random access preamble identifier in the response message being determined to be greater than the first random access preamble identifier, increasing the advance time data, or based on the second random access preamble identifier in the response message being determined to be less than the first random access preamble identifier, decreasing the advance time data, and reattempting sending of a physical random access channel initial access transmission reattempt to the base station based on the modified advance time data.

11. The method of claim 10, wherein the determining of whether the physical random access channel initial access transmission attempt was successful or unsuccessful determines that the attempt was unsuccessful based on a number of failed physical random access channel reattempts satisfying a failure attempt limit criterion, and in response to determining the attempt was unsuccessful, modifying, by the user equipment, the advance time data to modified advance time data, and sending, by the user equipment, a physical random access channel initial access transmission attempt to the base station before the scheduled time at a modified transmission time that is based on the modified advance time data.

12. The method of claim 11, wherein the modifying of the advance time data to the modified advance time data comprises at least one of: adding a multiple of communication detection window time interval to the advance time data, or subtracting a multiple of communication detection window time interval to the advance time data to obtain the modified advance time data.

13. The method of claim 12, wherein the modified transmission time is a first modified transmission time, wherein the modified advance time data is first modified advance time data, wherein the multiple is a first multiple, and further comprising modifying, by the user equipment, the advance time data to second modified advance time data, and sending, by the user equipment, a physical random access channel initial access transmission attempt to the base station before the scheduled time at a second modified transmission time that is based on the second modified advance time data.

14. The method of claim 10, wherein the determining of whether the physical random access channel initial access transmission attempt was successful or unsuccessful comprises receiving, by the user equipment, the response message from the base station, and detecting that the second random access preamble identifier in the response message does not equal the first random access preamble identifier.

15. A non-transitory machine-readable medium, comprising executable instructions that, when executed by at least one processor of a user equipment, facilitate performance of operations, the operations comprising:

advancing a scheduled transmission time obtained from received base station information for a random access channel initial access transmission, comprising:

determining advance time data based on distance information between the user equipment and the base station, a communication detection window time interval, and a physical random access channel detection window timeframe of the base station that is associated with a first random access preamble identifier;

sending the random access channel initial access transmission at a time that is before the scheduled transmission time based on the advance time data;

receiving a response message from the base station, the response message comprises a second random access preamble identifier; and modifying the advance time data based on a determination that the second random access preamble identifier fails to equal the first random access preamble identifier, wherein the modifying comprises:

based on the second random access preamble identifier being determined to be larger than the first random access preamble identifier, increasing the advance time data, or based on the second random access preamble identifier being determined to be smaller than the first random access preamble identifier, decreasing the advance time data.

16. The non-transitory machine-readable medium of claim 15, wherein the determining of the advance time data comprises determining a round trip time for communications based on the distance information, and subtracting one-half of the detection window time interval from the round trip time.

17. The non-transitory machine-readable medium of claim 15, wherein the sending of the random access channel initial access transmission is determined by the user equipment to be unsuccessful, and wherein the operations further comprise determining modified advance time data, and resending an instance of the random access channel initial access transmission at a modified time that is before the scheduled transmission time based on the modified advance time data.

18. The method of claim 10, wherein the determining the estimated roundtrip delay time comprises determining path loss data based on system information block data obtained from the base station.

19. The method of claim 10, wherein the determining the estimated roundtrip delay time comprises determining path loss data based on system information block data obtained from the base station and model data representative of a free propagation model.

20. The method of claim 10, wherein the determining the estimated roundtrip delay time comprises determining path loss data based on system information block data obtained from the base station and a propagation model associated with propagation model information broadcast by the base station.

* * * * *